Dec. 13, 1949 J. M. KEMPER 2,491,270
CABIN PRESSURE REGULATOR
Filed May 9, 1945
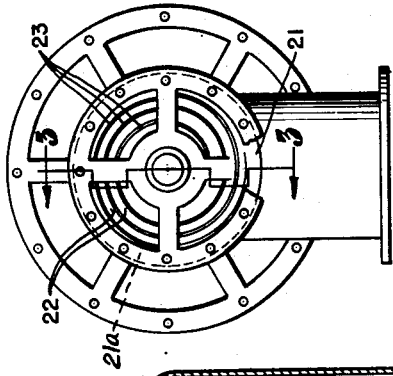
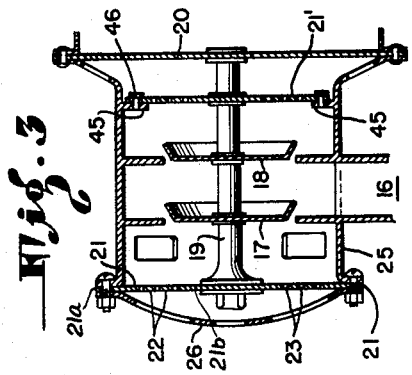
INVENTOR.
JAMES M. KEMPER
BY
ATTORNEY Patented Dec. 13, 1949

2,491,270

UNITED STATES PATENT OFFICE 2,491,270

CABIN PRESSURE REGULATOR

James M. Kemper, Los Angeles, Calif., assignor to The Garrett Corporation, Airesearch Manufacturing Company division, Los Angeles, Calif.

Application May 9, 1945, Serial No. 592,819

16 Claims. (Cl. 98—1.5)

1

This invention relates to apparatus for controlling the ventilation, under pressure, of the atmosphere within an enclosure such as an aircraft cabin and, while it is applicable to various methods of pressurizing, it has particular applicability to the method by which cabin pressure is permitted to remain substantially the same as atmospheric pressure until a predetermined altitude has been reached, is maintained at a substantially constant level between that altitude and a second predetermined and higher altitude and, above said second predetermined altitude, is maintained at a substantially fixed differential relative to external atmosphere.

The most successful application of this method of cabin pressure control has been in a regulator embodying an outlet valve for exhausting air from the cabin to atmosphere, under the control of cabin pressure and differential pressure responsive control devices. By making the outlet of sufficient area, the entire outflow of an aircraft cabin can be controlled by one or two of such regulators. However, where only one or two regulators are employed, the areas within the cabin more remote from such regulators will not be as well ventilated as the areas near the regulators, and the air in such remote areas will tend to become more or less stagnant. A primary object of the invention is to provide a ventilation system which will avoid this condition—i. e., a system which will give fairly uniform ventilation throughout the interior of an aircraft cabin. Accordingly, the invention embodies the concept of employing an adequate number of outflow control valves, sufficiently distributed throughout the area of the cabin enclosure to provide adequate distribution of outflow to attain uniformity of ventilation.

The mechanism of a pressure regulator of this type is somewhat complicated and quite delicate. It may require recurrent supervision and adjustment to maintain it in proper operating condition. Also, it involves considerable expense. Another object of this invention is to avoid the necessity for servicing a large number of control mechanisms. A further object is to avoid undue expense in equipping an aircraft cabin with adequate ventilation control.

Assuming the use of a fairly large number of control mechanisms in a single aircraft cabin, any derangement of one of such mechanisms could throw the entire control system out of balance. To locate the improperly operating control device might necessitate testing all of the control devices in the cabin. Another object of the invention is to provide a multiple outlet control system in which the control mechanism can be quickly and readily adjusted so as to provide uniform control at all of the outlets.

The utilization of only one or two control outlets would require such outlets to be of large size in order to handle the volume of outflow required for adequate ventilation. Such large units would be much more expensive to manufacture than smaller units. A further object of the invention is to provide a control system utilizing a number of relatively small outlet valves of relatively simple and inexpensive construction.

Further objects and advantages of the invention will be brought out in the following part of the specification.

Referring to the drawings which are for illustrative purposes only,

Fig. 1 is a schematic representation of an aircraft cabin and a ventilation system therefor embodying the invention;

Fig. 2 is a front elevation of one of the outlet valves; and

Fig. 3 is a transverse sectional view of the valve shown in Fig. 2, taken on the line 3—3 of Fig. 2.

As an example of a system embodying the invention, I have shown in Fig. 1 a schematic representation of an aircraft cabin 10 having means, such as a supercharger 11, associated therewith for delivering air thereinto under pressure. Outflow of air from the cabin is controlled in such a manner as to maintain the desired pressure in the cabin, by a master regulator A and a series of subordinate regulators B, C, etc. The regulator A is shown diagrammatically herein but may be of the type disclosed in applicant's prior application for a Cabin pressure regulator, Serial No. 556,790, filed October 2, 1944, now Patent No. 2,463,491. As shown herein the regulator A embodies means defining a pair of spaced annular chambers 12 and 13 which provide parallel paths for the flow of air from inlets 14 and 15 into the outlet chamber 16 past balanced valves 17 and 18. The valves 17 and 18 are carried by a shaft 19, which in turn is supported by two flexible supporting members 21 and 21'. Each supporting member is of disc-like form and comprises a rim 21a and a central portion 21b connected by spiral shaped arms or web members 22 which are separated by slits or slots 23 (Figs. 2 and 3). The shaft for each extends through the supporting member 21 and is operatively connected to the diaphragm 20. The diaphragm 20 and the supporting member 21 are clamped as indicated between respective casing sections 24, 25, and 26, the latter being an open spider or guard member protecting the supporting member 21. The supporting member 21' is bolted or otherwise fastened to an internal web portion 45 by screws or bolts 46.

The casing section 24 and diaphragm 20 cooperate to define a control chamber 27 in which is maintained a control pressure. The diaphragm 20 responds to differentials arising between the cabin pressure exerted against its side facing the chamber 13, and the pressure maintained in the control chamber 27, supplemented by the force of a coil compression spring 30. Any tendency of cabin pressure to drop below the level determined by the pressure in the control chamber 27 will result in a movement of the diaphragm 20 in a valve closing direction, restricting the flow past the valves 17 and 18 and causing the cabin pressure to rise to the proper level. Conversely, any tendency of cabin pressure to exceed the level determined by the pressure in the control chamber 27 will cause the diaphragm to move in valve opening direction, increasing the flow past the valves 17 and 18 and permitting the cabin pressure to drop to the proper level.

Each of the regulators B and C include all of the above described elements (designated by the same reference numerals, with the exception of the casing member 24, which in modified form is indicated at 24' in the subordinate regulators and the control chamber 27 which is indicated at 27' in the subordinate regulators). The control chamber 27 is connected to the control chambers 27' by conduits 31, 32, 33, etc. Consequently, the pressure in the chambers 27' will always be the same as the pressure in the control chamber 27, and as a result, the valves of the subordinate regulators B and C will function identically with the valves of the master control unit A.

The pressure in the control chamber 27 is controlled by pilot valves 34 and 35 adapted to bleed excess pressure from the control chamber 27 in accordance with the response of a pair of bellows bulbs 36 and 37 respectively.

Each bellows 36, 37 is anchored at one end to the casing member 24 and at its other end is connected to a lever 38. Each lever 38 is hinged at one end to the casing member 24 and is urged in valve closing direction at its other end by a spring 39. The pilot valves 34 and 35 embody metering pins cooperating with the ends of tubes 41 which branch from a conduit 42 connected to the outlet chamber 16 as indicated. The bellows 37 is likewise interiorly connected to the outlet chamber 16 and to the outside atmosphere by a conduit 43.

Cabin air enters the control chamber 27 through a restricted orifice 44 in the casing member 24. A small head of pressure within the cabin 10 over the pressure within the control chamber 27 will be normally maintained in order to induce such inflow, since, when the valves 17 and 18 are in equilibrium, the force exerted by cabin pressure on one side of diaphragm 20 equals the sum of the force exerted by pressure within the chamber 27 plus the force exerted by the compression spring 30. Outflow from the chamber 27, controlled by the valves 34 and 35, controls the pressure in the chamber 27, which in turn controls, through the diaphragm 20 and valves 17, 18, the pressure in the cabin 10 so as to maintain a predetermined cabin pressure.

Within the lower altitude range the absolute pressure responsive bellows 36 will maintain the valve 34 open, and the bellows 37 will maintain the valve 35 closed. Air will be permitted to escape from the chamber 27 as rapidly as it enters through the orifice 44, thereby substantially equalizing the pressure in the chamber 27 with atmospheric ambient pressure and correspondingly maintaining cabin pressure at substantially the ambient atmospheric level. When the airplane, in its ascent, approaches the altitude beginning the second range of operations, the pressure in the chamber 27 which has previously maintained the bellows 36 sufficiently collapsed to maintain the valve 34 open, will be reduced sufficiently to permit the spring 39 to partially close the valve 34, thus restricting the escape of air from the chamber 27 (the valve 35 being already closed). The pressure in the chamber 27 will thereafter remain substantially at the level determined by the closing of the valve 34, thus maintaining a substantially fixed cabin pressure throughout the second, or isobaric, range of operations.

When the airplane ascends to an altitude corresponding to the lower limit of the third range of operations, the pressure within the bellows 37, constantly dropping in step with the reduction of the ambient atmospheric pressure, will be overcome by the pressure in the chamber 27, sufficiently to overcome the pull of the spring 39 and will thereby commence to open the valve 35, valve 34 from this point on being fully closed. Thereafter the valve 35 will permit just enough air to escape from the chamber 27 to maintain therein a fixed differential over ambient pressure, and a corresponding differential pressure will be maintained in the cabin 10.

In all of these operations the pressure in the chambers 27' will be equalized with the pressure in the master control chamber 27 as the result of the communication between these chambers through the conduits 31, 32, 33, etc. and the action of all valves will be the same.

The master control regulator may, if desired, be simply a control unit embodying the control chamber 27 and the valves 34 and 35 and associated mechanism, but omitting the diaphragms 20 and outlet valve. Such a master control unit connected to the subordinate valve unit B and C in the manner shown in Fig. 1 will operate such unit in accordance with changes in pressure in the master control chamber.

I claim as my invention:

1. In an aircraft cabin pressurizing and ventilating system, in combination with an aircraft cabin: means for introducing air under pressure into said cabin; a master control regulator and a subordinate regulator, each embodying means forming a passage for the outflow of air from the cabin, a valve for controlling the flow of air through the passage, a pressure responsive element connected to said valve for transmitting movement thereto, and means cooperating with said element to define a control chamber, said pressure responsive element being exposed on one side to control chamber pressure and on the other side to cabin pressure only; means establishing intercommunication between said control chambers so that the pressures therein will equalize; and pilot valve means, responsive to changes in pressure internally of said master control regulator, for controlling the pressure in said control chamber of said master control regulator and thereby controlling the pressure in the other of said control chambers, whereby to control, through said pressure responsive elements, the position of said valves.

2. A control system for controlling the ventilation under pressure of the space within an enclosure into which a fluid is pumped under pressure, said system comprising: a subordinate control device comprising a control chamber, a pressure sensitive element forming one wall of said chamber, said pressure sensitive element being subjected to control chamber pressure on one side and enclosure pressure only on the other side, a valve connected to said pressure sensitive element and responsive to movement thereof, and an outlet controlled by said valve; means defining a master control chamber having a restricted connection with the interior of said enclosure; a conduit connecting said control chambers for equalizing the pressures therein; and means including a pilot valve associated with said master control chamber and responsive to the differential in the pressure in said chamber over ambient atmospheric pressure for controlling the pressure in said master control chamber, and correspondingly, the pressure in the other control chamber, whereby to control, through said pressure sensitive elements the position of said valves.

3. Mechanism for controlling the pressure in an enclosure, including: a subordinate control device comprising a control chamber, a pressure sensitive element forming one wall of said chamber and responsive to the differential between control chamber pressure and enclosure pressure only, a valve connected to said pressure sensitive element and responsive to movement thereof, and an outlet controlled by said valve; means defining a master control chamber having a connection with the interior of said enclosure; a conduit connecting said control chambers for equalizing the pressures therein; and means including a pilot valve associated with said master control chamber and responsive to changes in pressure within said chamber for controlling the pressure therein and correspondingly the pressure in the control chamber of said subordinate control device whereby to control the position of said valves through said pressure sensitive elements.

4. Mechanism for controlling the pressure in an enclosure, including: a subordinate control device comprising a control chamber, a pressure sensitive element forming one wall of said chamber, a valve connected to said pressure sensitive element and responsive to movement thereof, and an outlet controlled by said valve; means defining a master control chamber; means connecting the master control chamber with the interior of said enclosure a conduit connecting said control chambers for equalizing the pressure therein; and means including a pair of pilot valves associated with said master control chamber and operable independently of each other, said pilot valves being responsive to the pressure in said master control chamber and to the differential in pressure in said master control chamber over ambient atmospheric pressure respectively for controlling the pressure in said master control chamber and correspondingly the pressure in the control chamber of said subordinate control device whereby to control the position of said valves through said pressure sensitive elements.

5. In an aircraft cabin pressurizing and ventilating system, in combination with an aircraft cabin: means for introducing air under pressure into said cabin; a regulator embodying means forming a passage for the outflow of air from the cabin, a valve for controlling the flow of air to said passage, a pressure responsive element connected to said valve for transmitting movement thereto, means cooperating with said pressure responsive element to define a control chamber; a shaft on which said valve is mounted, one end of said shaft being mounted in said pressure responsive element, a flexible supporting member in which the other end of said shaft is mounted, said member being of disc form and comprising a rim and a central portion connected by spiral web members separated by slits in said supporting member; and pilot valve means subject to changes in pressure exteriorly of said control chamber for controlling the escape of air from said control chamber to a region of lower pressure and thereby controlling the pressure in said control chamber so as to control, through said pressure responsive element, the position of said valve.

6. In a regulator for an aircraft cabin pressurizing and ventilating system comprising: means forming a passage for the outflow of air from the cabin; a valve for controlling the flow of air to said passage; a pressure responsive element connected to said valve for transmitting movement thereto; means cooperating with said pressure responsive element to define a control chamber; a shaft on which said valve is mounted, one end of said shaft being connected to said pressure responsive element; a flexible supporting member to which the other end of said shaft is secured, said member being of disc form and comprising a rim and a central portion connected by spiral web members separated by slots in said supporting member; and pilot valve means responsive to changes in pressure internally of said control chamber for controlling the escape of air therefrom to a region of lower pressure and thereby controlling the pressure in said control chamber so as to control, through said pressure responsive element, the position of said valve.

7. Mechanism for controlling the pressure in an aircraft cabin, including: means forming a passage for the outflow of air from the cabin; a valve for controlling the flow of air to said passage; a pressure responsive element connected to said valve for transmitting movement thereto; means cooperating with said pressure responsive element to define a control chamber; a shaft on which said valve is mounted, one end of said shaft being connected to said pressure responsive element; a flexible supporting member to which the other end of said shaft is secured, said supporting member having openings therein; and pilot valve means responsive to changes in pressure interiorly of said control chamber for controlling the escape of air therefrom to a region of lower pressure and thereby controlling pressure in said control chamber so as to control, through said pressure responsive element, the position of said valve.

8. Mechanism for controlling the pressure within an enclosure, including: a master control device and a subordinate control device, each comprising a control chamber, a pressure responsive element subjected on one side to the pressure in said control chamber and on the opposite side to enclosure pressure only, a valve connected to said pressure responsive element and responsive to movements thereof, an outlet controlled by said valve, a connection between the control chamber of the master control device and the enclosure, and a connection between the control chamber of said master control device and a region of lower pressure; a conduit connecting said control chambers together for equalizing the pressures therein; a pilot valve controlling one of the connections of the master control chamber; and means absolutely responsive to the pressure in the master control chamber for controlling the position of said pilot valve and hence controlling the pressure in the master control chamber and correspondingly the pressure in the control chamber of the subordinate control device, to thereby control the position of the valves of said devices through the pressure responsive elements thereof.

9. Mechanism for controlling the pressure in an enclosure, including: a plurality of control devices, each comprising a control chamber, a pressure responsive element subjected on one side to control chamber pressure and on the opposite side to enclosure pressure only, a valve connected to said pressure responsive element and responsive to movements thereof, and an outlet controlled by said valve, one of said control chambers having an inlet connected with the interior of the enclosure and an outlet connected to a region of lower pressure; conduit means connecting said control chambers for equalizing the pressures therein; and means, including a pilot valve controlling one of the connections of said control chamber and a device sensitive to the pressure in one of said control chambers for controlling said pilot valve, said means controlling the pressure in the control chambers for controlling the valves of said control devices.

10. Mechanism for controlling the pressure within an enclosure, including: a plurality of control devices, each of which includes means defining a control pressure chamber, a pressure responsive element subjected on one side to control chamber pressure and subjected on the opposite side to enclosure pressure only; conduit means connecting the control pressure chambers; and pilot valve means responsive to changes in pressure within one of said control chambers for controlling the pressure in said chambers.

11. The invention defined by claim 10, wherein one of said control chambers has an inlet connection from a region of higher pressure and an outlet connection to a region of lower pressure, and said pilot valve means controls one of said connections.

12. Mechanism for controlling the pressure within a cabin, including: a plurality of control devices, each of which includes a pressure responsive element subjected on one side to cabin pressure only, and walls defining a control pressure chamber, the pressure responsive element being subjected on its opposite side to the pressure in said control chamber; walls defining conduit means connecting the control chambers together, the above mentioned walls defining an enclosure for a control pressure; inlet means for said control pressure enclosure and outlet means therefor; a pilot valve controlling one of said means; and a device sensitive to control pressure for controlling said pilot valve.

13. The invention defined by claim 12, wherein the pressure sensitive device is absolutely responsive to control pressure.

14. The invention defined by claim 12, wherein the pressure sensitive device is responsive to differential of pressure between that in the enclosure and atmosphere.

15. The invention defined by claim 12, wherein the pressure sensitive device is responsive to the differential between control pressure and atmosphere and there is a second pilot valve and pressure sensitive device absolutely responsive to control pressure.

16. Mechanism for controlling the pressure in an aircraft cabin, including: means forming a passage for the outflow of air from the cabin; a valve for controlling the flow of air through said passage; a pressure responsive element connected to said valve for transmitting movement thereto; means cooperating with said pressure responsive element to define a control chamber; a shaft on which said valve is mounted, one end of said shaft being connected to said pressure responsive element; a flexible supporting member to which the other end of said shaft is secured, said member being of disc form and comprising a rim and a central portion connected by spiral web members separated by slots in said supporting member; and pilot valve means responsive to changes in pressure interiorly of said control chamber for controlling the escape of air therefrom to a region of lower pressure and thereby controlling the pressure in said control chamber so as to control, through said pressure responsive element, the position of said valve.

JAMES M. KEMPER.

REFERENCES CITED

The following references are of record in the file of this patent:

UNITED STATES PATENTS

| Number | Name | Date |
|---|---|---|
| 220,202 | Wilder | Sept. 30, 1879 |
| 518,199 | Sarvent | Apr. 10, 1894 |
| 530,200 | Olson | Dec. 4, 1894 |
| 720,375 | Nageldinger | Feb. 10, 1903 |
| 757,881 | Burke | Apr. 19, 1904 |
| 1,339,373 | Buensod | May 4, 1920 |
| 2,391,197 | Schwien | Dec. 18, 1945 |
| 2,396,116 | Noxon | Mar. 5, 1946 |
| 2,397,804 | Nakken et al. | Apr. 2, 1946 |
| 2,405,670 | Price | Aug. 13, 1946 |